Figure 1:
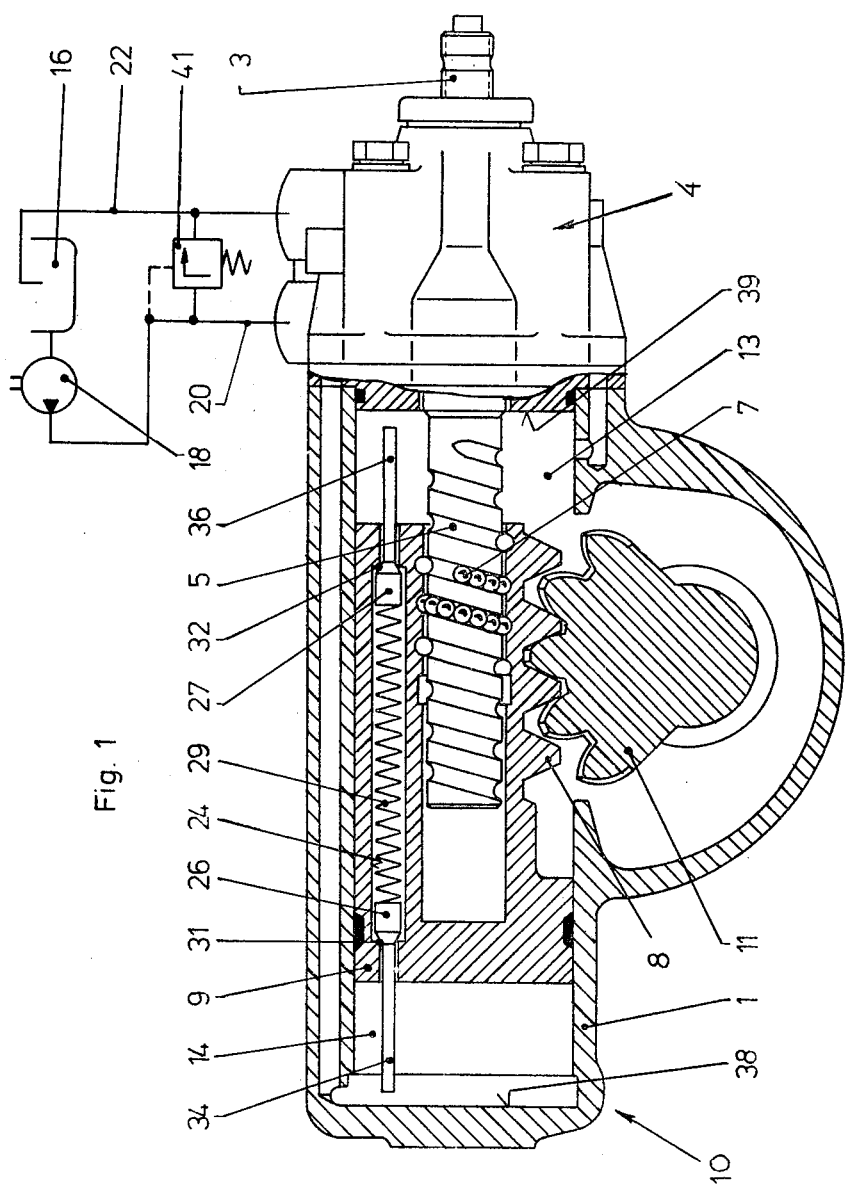

United States Patent [19]

Elser et al.

[11] 4,261,248

[45] Apr. 14, 1981

[54] AUXILIARY POWER STEERING SYSTEM WITH RELIEF VALVE CONTROL

[75] Inventors: Dieter Elser, Essingen-Lauterberg; Gerhard Kuhn, Schwabisch, both of Fed. Rep. of Germany

[73] Assignee: Zahnradfabrik Friedrichshafen, AG., Friedrichshafen, Fed. Rep. of Germany

[21] Appl. No.: 41,395

[22] Filed: May 22, 1979

[51] Int. Cl.³ .......................... F15B 15/22; B62D 1/20
[52] U.S. Cl. ........................................ 91/401; 74/499
[58] Field of Search ................ 91/480, 401, 402, 357, 91/433, 438, 439; 92/165 R; 74/499

[56] References Cited

U.S. PATENT DOCUMENTS

| | | | |
|---|---|---|---|
| 3,092,083 | 6/1963 | Sheppard | 91/401 X |
| 3,252,380 | 5/1966 | Jablonsky | 91/400 X |
| 3,315,570 | 4/1967 | Brewer | 91/401 |
| 3,905,277 | 9/1975 | Rosell | 91/400 |
| 4,028,996 | 6/1977 | Jablonsky | 91/401 |
| 4,170,925 | 10/1979 | Katz | 91/400 |

*Primary Examiner*—Edward J. McCarthy
*Attorney, Agent, or Firm*—Zalkind & Shuster

[57] ABSTRACT

The maximum operating pressure for the fluid servomotor of a fluid power operated steering system is varied as a function of steering displacement by varying the spring prestress bias on a relief valve controlling fluid discharge from the operating chamber of the fluid servomotor. The valve spring prestress is controlled by a spring engaged plunger that is displaced relative to the servomotor piston during steering displacement.

13 Claims, 7 Drawing Figures

AUXILIARY POWER STEERIN
RELIEF VALVE CO[

BACKGROUND OF THE

This invention relates to a flui
system having at least one fluid ser
operating fluid is discharged unde
valve to control the maximum p
steering power purposes.

The present invention is applical
steering mechanisms having a me
between the hand steering wheel ar
a vehicle and to hydrostatic s
wherein the steering forces are tra
ized liquid. In hydro-steering mec
known type, the two operating
servomotor are connected to one
charge of operating liquid. The rel
a shock absorber to prevent overlc
sively high pressure that may othe
sult of road influences. In hydr
steering mechanisms, the operati
servomotor are connected to a val
for controlling discharge of the o
latter type of steering mechanism
ample, on page 10 of a publication
with Accessories and Available P
the Assignee of the present appli
many identified as G 7,000, P. T
shown therein serve to connect the
chamber of the servomotor to a di
steering gear approaches its lin
thereby avoid overtravel of the pis
of the steering linkage connecte
impetus of full hydraulic power.
lem dealt with by such discharge
ever, from the problem with whic
tion is concerned.

The present invention relates to
ing relatively heavy commercial
while in a substantially stationary
ing high steering resistance as a r
In such cases, the steering of
wheels requires hydraulic power
When provided with a powerfu
system to meet such high power re
cle driver is often tempted to over
on the hand steering wheel are
straight ahead travel. The vehicl
sufficiently dimensioned or struct
sulting stresses. In order to prever
cle, auxiliary power steering syste
low hydraulic power output have
lized deliberately providing insufl
ity for the vehicle in the standing

SUMMARY OF THE I

In accordance with the prese
systems of the fluid operated type
provided so that only during stra
vehicle, either no hydraulic steer
low auxiliary steering power is pr
driver will be induced to exert a
during straight ahead travel and tl
sense of feeling for road steerin
other hand, the steering system v
output power while the vehicle is nected to a control valve 4 and to a worm gear element 5. The worm element 5 has spiral grooves through which ball elements 7 run for drive engagement with an internally grooved ball nut 8 on which rack teeth are externally formed for meshing engagement with the teeth on a sector gear 11 connected to the steering linkage through a steering shaft. The ball nut 8 has a piston formation 9 connected thereto forming part of a servomotor generally referred to by reference numeral 10. The servomotor also includes two fluid operated chambers 13 and 14 enclosed by the housing 1 on opposite axial sides of the piston 9.

Also schematically shown in FIG. 1 is a fluid storage tank 16 connected to a high pressure pump 18 from which pressurized fluid is conducted through conduit 20 to the housing 1. Fluid under a low exhaust pressure is returned from the steering gear mechanism to the tank 16 through return conduit 22 when the hand steering wheel and steering control valve 4 are in a central position. The pressurized fluid in conduit 20 is supplied with increasing pressure, depending on the amount of steering displacement, to operating chamber 13 or 14. The foregoing supply of pressurized operating fluid under control of steering valve 4 in a hydrosteering system is already known in the art.

According to the embodiment of the invention illustrated in FIG. 1, two relief valve elements 26 and 27 are mounted for displacement in a single common bore 24 formed in the piston 9 parallel to its longitudinal axis or the rotational axis of the worm gear element 5. A common compression spring 29 enclosed within the bore 24 between the relief valve elements 26 and 27 urges the relief valve elements into engagement with valve seats 31 and 32 at the opposite ends of the bore. Both relief valve elements are thus biased to their valve closing positions by the valve spring 29 under a predetermined prestress. Each relief valve has a plunger 34 or 36 extended therefrom in opposite axial directions terminating at ends closely spaced from the end walls 38 and 39 of the servomotor chambers 14 and 13 in the central position of the piston 9 as shown in FIG. 1. In the central position shown, the relief valves 26 and 27 are ineffective since they block discharge from both chambers 13 and 14. Whenever the piston 9 is displaced in a lefthand direction, for example by pressurization of chamber 13 during a steering operation, the relief valve 26 is opened as a result of plunger 34 abutting the end wall 38 in the servomotor operating chamber 14. It will therefore be apparent that any continued steering displacement will result in an increased stressing of spring 29 to thereby increase the closing bias exerted by the spring 29 on the relief valve element 27 in order to correspondingly increase the maximum operating pressure available within the pressurized expanding chamber 13. Only when the maximum operating pressure is exceeded, will valve 27 open to discharge fluid from chamber 13 through bore 24 into the low pressure contracting chamber 14. The increase of maximum pressure for operating chamber 13 occurs linearlly beginning with the instant at which valve element 26 is displaced in a righthand direction by abutment of plunger 34 with end wall 38 in chamber 14. During steering displacement of piston 9 in a righthand direction, a similar and corresponding action occurs with respect to a linear increase of maximum available pressure in chamber 14 by an increase in the spring bias applied to relief valve 26 upon displacement of the relief valve 27 by plunger 36 abutting end wall 39.

Figure 2:
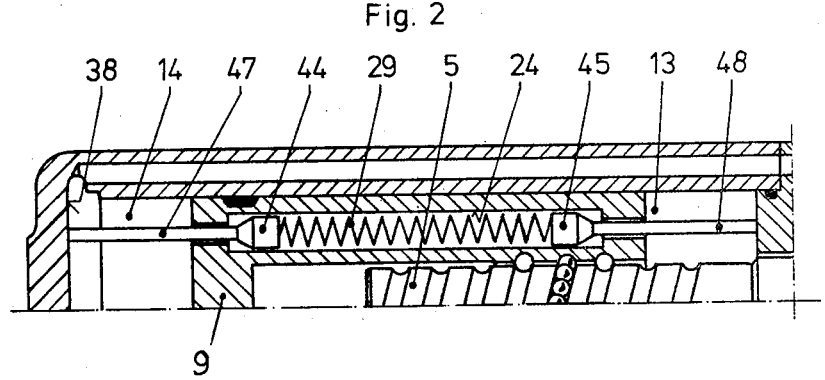

FIG. 2 illustrates a somewhat different relief valve arrangement from that shown in FIG. 1. According to the embodiment shown in FIG. 2, both relief valve elements 44 and 45 are also mounted adjacent opposite axial ends of a common bore 24 also disposed within piston 9 parallel to the longitudinal axis of the piston. Also, a common spring 29 is disposed between the relief valve elements 44 and 45. The plungers 47 and 48 are, however, of such a length that they engage the end walls 38 and 39 of the operating chambers in order to hold both of the relief valve elements in their open positions in the central position of the piston as shown. Accordingly, steering displacement of the piston 9 from the center position shown in FIG. 2, by a limited amount, will be occasioned by unrestricted flow of fluid through bore 24 so as to preclude generation of any hydraulic power for steering purposes. Steering displacement of piston 9 beyond a limited amount in a righthand direction, for example, causes relief valve 44 to be closed under the bias of spring 29 as plunger 47 leaves contact with end wall 38. A surge pressure buildup therefore occurs within expanding chamber 14. Continued steering displacement of piston 9 will further stress spring 29 as plunger 48 in abutment with end wall 39 displaces relief valve element 45 relative to piston 9 within bore 24. Accordingly, the maximum available operating pressure within chamber 14 increases linearlly.

In both of the embodiments respectively illustrated in FIGS. 1 and 2, an additional relief valve 41 is required between the pressure supply and return conduits 20 and 22 as shown in FIG. 1 because the relief valves will be ineffective in the central position of the piston and are then unable to adjust maximum pressure for overcoming roadway resistances. The additional relief valve 41 thus operates to adjust pressure during pressure assisted reverse steering action.

Figure 3:
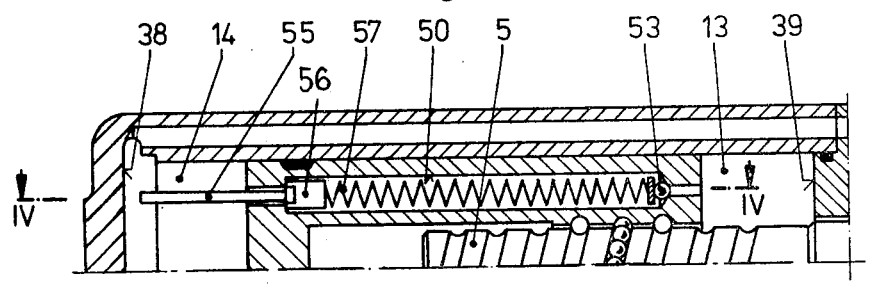
Figure 4:
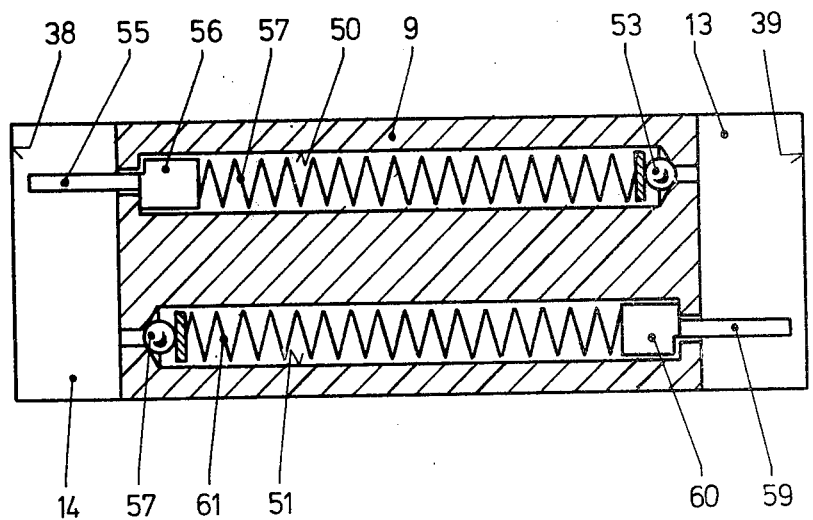

FIGS. 3 and 4 illustrate yet another embodiment in which two bores 50 and 51 are formed within the piston 9 parallel to its longitudinal axis. A relief valve element 53 is positioned at the right end of bore 50 while a stop element 56 at the other end has a plunger 55 extending into the operating chamber 14. A compression spring 57 is disposed within bore 50 between the relief valve element 53 and the stop element 56. Similarly within bore 51, relief valve and stop elements 57 and 60 are disposed, but at reverse ends of the bore as compared to bore 50. A compression spring 61 is also disposed between the relief valve 57 and stop element 60. In every operating position of piston 9, either relief valve element 53 or relief valve element 57 is fully effective so that no additional relief valve is required as in the case of the embodiments illustrated in FIGS. 1 and 2. Thus, in the central position of the piston 9 as shown in FIGS. 3 and 4, the relief valve elements 53 and 57 will be effective to provide maximum pressure adjustment for pressure assisted reverse steering as a result of roadway resistances. When piston 9 is displaced in a lefthand direction, for example, pressure will build up in operating chamber 13, the maximum level of which is determined by the relief valve 53. As soon as plunger 55 engages end wall 38, the prestress of spring 57 is increased so that relief valve element 53 increases the maximum possible operating pressure in chamber 13 then acting as the expanding chamber. A similar action occurs with respect to pressure control in operating chamber 14 during righthand steering displacement of piston 9.

According to other embodiments of ... vention, the relief valve elements could b... end walls of the operating cylinder wit... piston 9 is displaceable. However, such an ...ement would be suitable only for a steering mechanism of greater axial extent.

Figure 5:
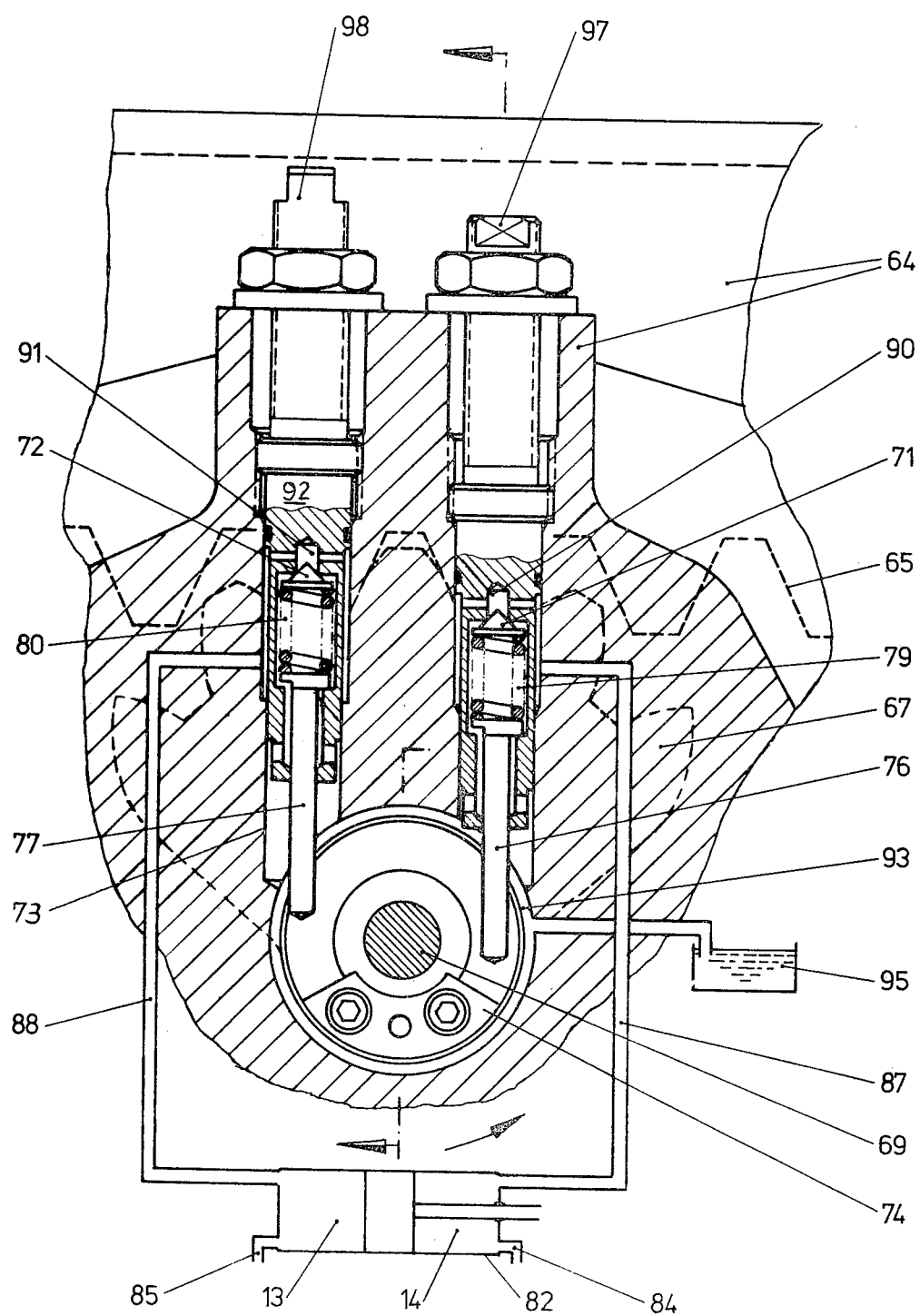

A still further embodiment of the invention is illustrated in FIG. 5 in which the spring prestress in relief valves 71 and 72 are controlled by a steering shaft 69. FIG. 5 shows a portion of the toothing 65 of the worm driven nut in dotted line meshing with a steering gear segment 67 torsionally connected to the steering shaft 69. The two relief valve elements 71 and 72 are housed in parallel spaced bores 73 within the steering gear housing with their displacement axes defining a plane transverse to the axis of steering shaft 69. A stop segment 74 is torsionally connected to the steering shaft 69 for limiting displacement of plungers 76 and 77 that project from the bores 73. The plungers 76 and 77 form abutments for compression springs 79 and 80 which exert closing bias on the relief valve elements 71 and 72.

In the position shown in FIG. 5, both relief valves 71 and 72 are active to limit the maximum pressure prevailing in inlet chambers 90 and 91 in the valve bodies 92. The plunger 76 or 77 is engaged by the stop segment 74 only after a predetermined steering displacement has occurred to increase the prestress or bias of the spring 79 or 80 and thereby increase the maximum operating pressure available. As in the embodiments hereinbefore described, a servomotor 82 may either be integrated into the steering gear mechanism shown in FIG. 5 or constructionally formed as a separate unit. The servomotor 82 receives pressurized fluid through conduits 84 or 85 from the control valve in accordance with steering displacement. The operating chambers 13 and 14 of the servomotor are connected by conduits 87 and 88 to the inlet chambers 90 and 91 normally closed by the relief valves 71 or 72. Upon opening of one of the relief valves, operating fluid flows from the expanding one of the servomotor chambers 13 or 14 through chamber 93 in the steering housing into a fluid storage tank 95.

The two relief valve bodies 92 shown in FIG. 5 are adjustably positioned in the housing by means of adjusting screws 97 and 98 to vary the spacing of plungers 76 and 77 from the stop segment in the central position of shaft 69. Thus, the amount of steering displacement possible may be adjusted by changing the point at which the operating pressure is increased following initial steering displacement from the central position. The spacing of the plungers 76 and 77 from the stop segment 74 may be adjusted as shown by different distances for asymmetrical steering purposes.

Figure 6:
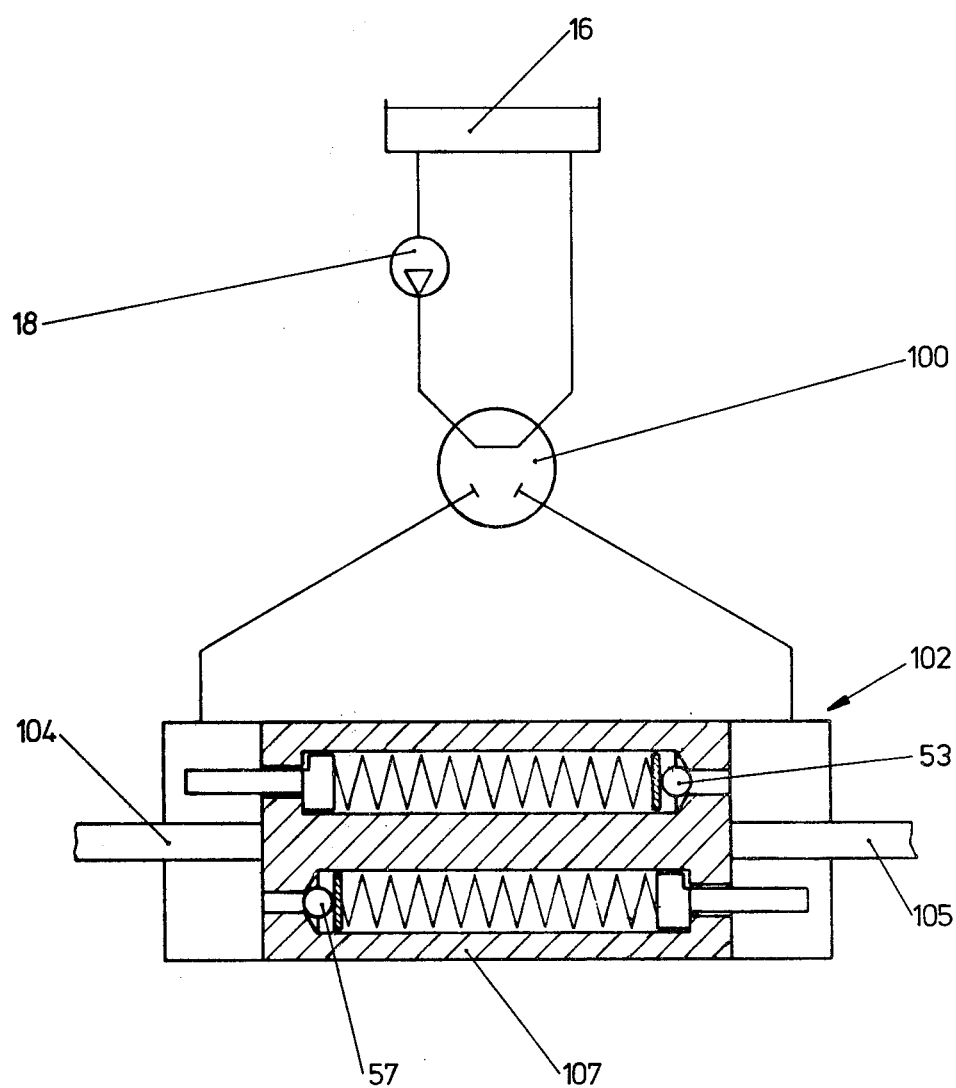
Figure 7:
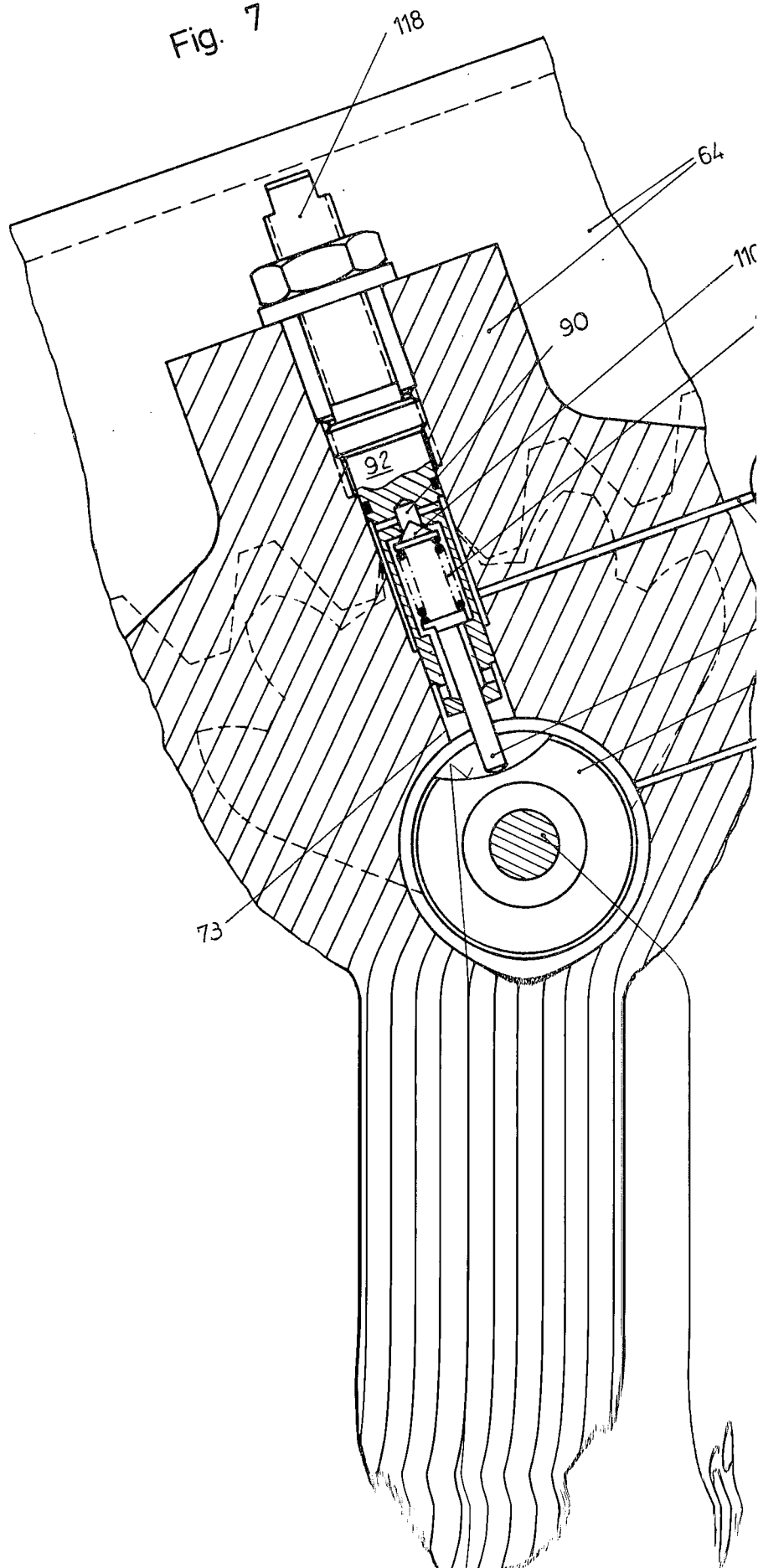

While all of the embodiments hereinbefore described by way of example, illustrate application of the invention to fluid pressure operated steering systems, FIG. 6 illustrates application of the invention to a hydrostatic type of steering mechanism. The latter type of steering mechanism, as is well known in the art, includes a fluid reservoir tank 16, and a high pressure pump 18, as shown in FIG. 7 as well as a steering control valve 100 as shown in FIG. 6. The valve 100 as shown in FIG. 6 in its center position, blocks fluid flow to the fluid servomotor cylinder 102. The operating cylinder 102 has piston rods 104 and 105 extending from opposite axial ends thereof, connected to a piston 107 balanced by end pressure surfaces of equal area. Mounted within the piston 107 are relief valve elements 53 and 57 forming an arrangement similar to that described with respect to ...ccordingly, the relief valve elements 53 and operate and function in a manner similar to that hereinbefore described with respect to FIGS. 3 and 4.

The embodiment illustrated in FIG. 7 is similar to that of FIG. 5 insofar as the relief valves are concerned except for the use of a single relief valve element 110 and associated compression spring 112. The prestress of the spring 112 is controlled by a plunger 114 and cam element 116 torsionally connected to the steering shaft 69. The valve body 92 within which the relief valve element 110 is disposed, is also adjustable relative to the cam element 116 by an adjusting screw 118 so that pressure regulation may be varied. The high pressure pump 18 supplies operating fluid from tank 16 through conduit 120 to a control valve (not shown) and the inlet chamber 90 associated with the relief valve element 110. The spring and valve bore 73 in housing 64 is connected by conduit 122 to the tank 16. The control surface 124 of the cam element 116 may be shaped so as to provide the desired pressure regulation characteristic.

What is claimed is:

1. In combination with a fluid operated steering system having a steering shaft (11, 69), a steering gear including relatively movable elements (8, 65), a servomotor (10) including at least two operating chambers (13 and 14) that are alternatively pressurized with fluid under an operating pressure, and relief valve means (26-27, 44-45, 53-57, 71-72) connected to said chambers for discharge of said fluid therefrom to limit the operating pressure therein to a maximum, said relief valve means having a prestressed valve spring (29, 56, 61, 79, 80) exerting a valve closing bias, and a device (34-36, 47-48, 55-59, 76-77, 114) for varying the prestressing of the valve spring comprising means for increasing the valve closing bias of the valve spring in response to displacement of the steering shaft from a central position to increase the maximum operating pressure developed in one of the operating chambers of the servomotor.

2. In combination with a fluid operated steering system having a steering shaft (11, 69), a steering gear including relatively movable elements (8, 65), a servomotor (10) including at least two operating chambers (13 and 14) that are alternatively pressurized, and relief valve means (26-27, 44-45, 53-57, 71-72) connected to said chambers for discharge of fluid therefrom to establish a maximum pressure therein, said relief valve means having a prestressed valve spring (29, 56, 61, 79, 80) exerting a valve closing bias, and a device (34-36, 47-48, 55-59, 76-77, 114) for controlling the prestressing of the valve spring comprising means for increasing the valve closing bias of the valve spring in response to displacement of the steering shaft from a central position to increase the maximum pressure in one of the operating chambers of the servomotor, said relief valve means including a pair of valve elements (44-45) respectively exposed to said operating chambers, said prestress controlling device further including means (47, 48) for holding both of said valve elements opened in the central position of the steering shaft and during displacement of the steering shaft from the central position by a limited amount.

3. The combination of claim 1, wherein said relief valve means includes a pair of valve elements respectively exposed to the fluid in said operating chambers and means (34-36, 55-59, 76-77) for rendering the prestress device effective only after said steering shaft is displaced from the central position by a limited amount.

4. In combination with a fluid operated steering system having a steering shaft (11, 69), a steering gear including relatively movable elements (8, 65), a servomotor (10) including at least two operating chambers (13 and 14) that are alternatively pressurized, and relief valve means (26-27, 44-45, 53-57, 71-72) connected to said chambers for discharge of fluid therefrom to establish a maximum pressure therein, said relief valve means having a prestressed valve spring (29, 56, 61, 79, 80) exerting a valve closing bias, and a device (34-36, 47-48, 55-59, 76-77, 114) for controlling the prestressing of the valve spring comprising means for increasing the valve closing bias of the valve spring in response to displacement of the steering shaft from a central position to increase the maximum pressure in one of the operating chambers of the servomotor, said prestress controlling device including at least one plunger (34, 36, 47, 48, 55, 59, 76, 77) engageable with the valve spring.

5. The combination of claim 4 wherein said servomotor further includes a piston (9) separating said operating chambers and connected to one of said relatively movable elements, said relief valve means including a pair of valve elements (26-27, 44, 45, 53-57) mounted in the piston, said prestress controlling device projecting from the piston.

6. The combination of claim 5 wherein the prestress controlling device further includes a bore (24, 50, 51, 73) formed in the piston within which the valve spring is enclosed, said plunger engageable with the valve spring extending from the bore externally of the piston.

7. The combination of claim 5 wherein the prestress controlling device further includes separate bores (50, 51) formed in the piston within which said pair of valve elements are respectively disposed.

8. The combination of claim 4, wherein said servomotor further includes a cylinder having opposite axial end walls, a piston (9) connected to one of said relatively movable elements and separating the operating chambers, at least one bore (50) formed in the piston within which the valve spring and the relief valve means are disposed, said plunger being engageable with the valve spring within said bore and projecting from the piston for engagement with one of said end walls of the cylinder.

9. The combination of claim 4, including a stop element (74) connected to the steering shaft (69) and engageable with said plunger in response to displacement of the steering shaft beyond a limited amount from the central position.

10. A fluid operated steering system having at least one servomotor (10), relief valve means (110) for discharge of pressurized fluid supplied to the servomotor having a prestressed valve spring (112) establishing a maximum pressure in the servomotor, steering gear means having a steering shaft (69) displaceable from a central position, and a prestress controlling device operatively connected to said steering gear means for increasing the prestress of said valve spring in response to displacement of the steering shaft from said central position.

11. A fluid operated steering system having at least one servomotor (10), relief valve means (110) for discharge of pressurized fluid supplied to the servomotor having a prestressed valve spring (112) establishing a maximum pressure in the servomotor, steering gear means having a steering shaft (69) displaceable from a central position, and a prestress controlling device operatively connected to said steering gear means for increasing the prestress of said valve spring in response to displacement of the steering shaft from said central position, said steering gear means further including a housing (64) within which the relief valve means is mounted in operative relation to the steering shaft, a cam element (116) engageable with the prestress controlling device, and means torsionally connecting the cam element to the steering shaft.

12. The combination of claim 11 wherein said prestress controlling device includes a plunger (76, 77, 114).

13. The combination of claim 12 including means (97, 98, 118) for adjustably positioning the relief valve means in the housing.

* * * * *